United States Patent [19]

Holdiman

[11] 4,105,352

[45] Aug. 8, 1978

[54] CORNER CLIP FOR A WINDOW PRODUCT

[75] Inventor: Joe W. Holdiman, Rantoul, Ill.

[73] Assignee: Scovill Manufacturing Company, Waterbury, Conn.

[21] Appl. No.: 815,067

[22] Filed: Jul. 12, 1977

[51] Int. Cl.² ............................................. F16B 2/20
[52] U.S. Cl. ................................... 403/402; 52/657; 160/381; 403/405
[58] Field of Search ..................... 403/231, 402, 405; 160/381; 52/656, 657

[56] References Cited

U.S. PATENT DOCUMENTS

| 891,604 | 6/1908 | Diamond | 403/405 X |
| 959,859 | 5/1910 | Higgin | 160/381 |
| 1,450,513 | 4/1923 | Pearson et al. | 403/231 |
| 2,519,628 | 8/1950 | Bothe | 403/231 X |
| 3,034,612 | 5/1962 | Jourdan | 160/381 |
| 3,302,962 | 2/1967 | Heywood | 403/405 X |
| 4,024,691 | 5/1977 | Hansen et al. | 403/402 X |

Primary Examiner—Werner H. Schroeder
Assistant Examiner—Conrad L. Berman
Attorney, Agent, or Firm—Wegner, Stellman, McCord, Wiles & Wood

[57] ABSTRACT

A corner clip for securing fins for a window product which extend outwardly from the sides. The corner clip is in the form of a base plate having two generally perpendicular legs each of which is defined by an inner and an outer side. Lips extend upwardly along the inner side of each leg and channels extend along the outer side of each leg. The lips engage a slot formed between the clip and the window product and the channels engage the edges of the fins. The length of each channel on each leg is at least as long as the length of the engaged portion of the lip.

8 Claims, 7 Drawing Figures

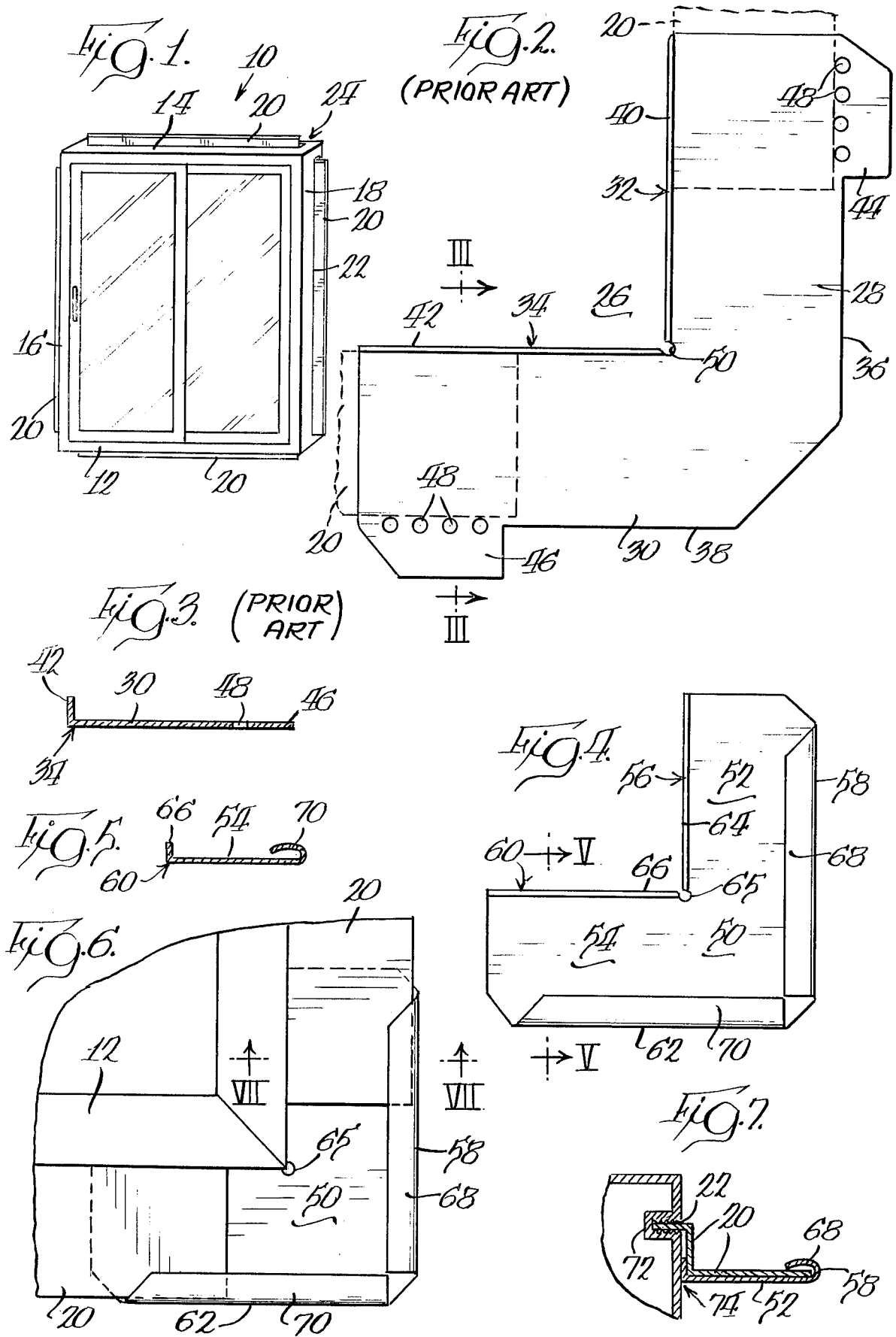

4,105,352

CORNER CLIP FOR A WINDOW PRODUCT

BACKGROUND OF THE INVENTION

This invention relates to clips or fasteners and, more particularly, to a corner clip for a window product.

Prefabricated window products, such as double-hung windows, casement windows, sliding windows and patio doors are often cladded with metal on their exterior surface. Such cladded window products are disclosed in application Ser. No. 763,910, filed Jan. 12, 1977, assigned to the assignee of the present invention.

Many window products, including those described in the above-noted application, have a channel around the outer perimeter in which a fin can be rigidly inserted. The fin extends outwardly around the perimeter and is usually inserted within the channel by the carpenter in the field. The fin is usually of metal, as thin galvanized sheet metal, and is of sufficient strength to aid in the retention of the window to the rough opening in the building. Nails are driven through the fins to secure the window product to the rough frame.

Since the edges or fins extend outwardly along the sides of the window products, there is a void at the corners. It is desirable to attach a clip at the corner which engages the fins along adjacent sides to fill the void. The clips add rigidity to the fins and form a continuous fin around the entire perimeter. The continuous fin lessens airflow between the exterior and the interior side of the window product.

Corner clips have been installed by the carpenter placing them at the corner and bending tabs which extend from each side of the clip over the fins. If the crimping is not done properly, the clip will be loose at the corner or may completely detach from the fins after installation of the window product.

I have developed a clip or fastener that does not require that tabs be crimped over the fins, yet is capable of being inserted at the corner after the fins have been secured to the sides of the window product. The corner clip is securely retained by the fins, thus eliminating an undesirable problem.

SUMMARY OF THE INVENTION

A corner clip secures outwardly extending fins from a window product. The clip may be of metal or plastic and is formed of a single piece of material. The clip is in the form of a base plate having a first leg integral with a second leg. The axes of the legs are generaly parallel to the sides of the window product. Lips extend along the inner side of the clip along each leg and are adapted to engage a slot formed between the fin and the window product. Channels, the length of which are at least as long as the length of each lip when engaged in the slot, are formed along the outer side of the clip along each leg. The clip is retained at the corner by the engagement of the slot by the lips and retained on the fins by the channels.

It is a feature of the present invention to provide a corner clip for a window product which can be secured with minimum effort.

Another feature of the invention is to provide a prefabricated clip which is retained at the corner but does not have crimping tabs and need not be crimped at the jobsite.

Other features and advantages will become apparent when considering the following specification in combination with the drawing in which:

DRAWING

FIG. 1 is a perspective view of an example of a window product having the outwardly extending fins;

FIG. 2 is a top view of a corner clip, known to the prior art, for a window product;

FIG. 3 is a cross-sectional view taken along the lines III—III of FIG. 2;

FIG. 4 is a top view of the clip contemplated by this invention;

FIG. 5 is a cross-sectional view taken along the line V—V of FIG. 4;

FIG. 6 is a top view of the clip of FIG. 4 engaged at the corner of a window product; and FIG. 7 is a cross-sectional view taken along line VII—VII of FIG. 6.

DESCRIPTION OF PREFERRED EMBODIMENT

Referring to FIG. 1, a patio door assembly 10 has bottom side 12, upper side 14, left side 16 and right side 18. Although a patio door assembly is shown, it is to be understood that the invention applies to other cladded window products in a manner similar to that described.

Thin metal fins 20 are secured to bottom side 12, upper side 14 and left and right sides 16 and 18, and extend outwardly therefrom in a generally perpendicular manner. The fins are retained in an outwardly opening channel, as channel 22, along right side 18. The sides of the channels are provided with barbs which retain the edge of the fins when engaged (see FIG. 7, for example). The fins aid in securing the window product to the rough frame structure. It is common to nail through the fins into the rough frame about which the patio door is to be secured. An absence of metal occurs at the corner, as corner 24, between upper side 14 and right side 18, since the fins extend outwardly only from the sides.

Referring to FIGS. 2 and 3, a clip 26, known to the prior art, has been used to fill the void at the corner, as corner 24. The clip 26 is in the form of a base plate and has a leg 28 which is integral with leg 30. The legs are defined by inner sides 32 and 34 and outer sides 36 and 38, respectively. Inner sides 32 and 34 have upwardly extending lips 40 and 42 which engage a slot formed by fin 20 and patio door assembly 10. After the lips have been engaged in the slots, tabs 44 and 46 are crimped over fins 20 to secure clip 26 in place. Perforations 48 simplify crimping. The length of the tabs are short with respect to the length of the outer sides. Also, recess 50 may be formed at the intersection of inner sides 32 and 34 to obviate the need for removing metal burrs which may appear at the corner of the metal cladding.

Referring to FIGS. 4 and 5, the improved clip will now be described. Clip 50 is formed of metal (as 0.016 inch sheet metal) or plastic, and is in the form of a base plate having a leg 52 which is integral with leg 54. The axis of leg 52 is shown to be perpendicular to the axis of leg 54, it being anticipated that clip 50 is to be used at a 90° corner. However, the axis of the leg is selected to be generally parallel to the sides of the window product. Leg 52 is defined by inner side 56 and outer side 58, the distance therebetween being slightly greater than the width of the fin, as fin 20 (FIG. 1). Similarly, leg 54 is defined by inner side 60 and and outer side 62. Lips 64 and 66 extend upwardly from inner sides 56 and 60, respectively. Inwardly opening channels 68 and 70, the openings of which form lips 64 and 66, are integrally formed with legs 52 and 54, respectively, along outer sides 58 and 62. Recess 65 may be formed at the corner by inner sides 56 and 60.

Referring to FIGS. 6 and 7, clip 50 is shown to engage fins 20 at a right-angled corner. As discussed previously, fin 20 is received in a channel 22 to form a slot 72 between it and side 18, for example. A similar slot is formed by fin 20 with bottom side 12. Lips 64 and 66 are inserted into the slots and channels 68 and 70 engage the outer edges of fins 20. The length of channel 68 is at least as long and preferably longer than the length of lip 64 which is engaged in slot 74. Similarly, the length of channel 70 must be at least as long, and preferably longer, than the length of lip 66 which is engaged in the slot formed by fin 20 and bottom side 12.

I claim:

1. A corner clip connecting outwardly extending fins from a first and a second side of a window product comprising:

a base plate having a first leg integral with a second leg, the first leg defined by an inner and an outer side having a length the axis of which is generally parallel to the first side of the window product, the second leg defined by an inner and an outer side having a length the axis of which is parallel to the second side of the window product;

a first and a second lip extending upwardly along the inner sides of the first and the second legs from the base plate for engaging a slot formed between the fins and the first and the second side of the window product;

a first and a second channel extending along the outer side of the first and the second legs, the opening of the first and the second channel facing the first and the second lips, respectively, the channels adapted to receive the outwardly extending fins, the length of the first channel being at least as long as the length of the first lip which is engaged by the slot, the length of the second channel being at least as long as the length of the second lip which is engaged by the slot.

2. The corner clip of claim 1 wherein the length of the first leg equals the length of the second leg.

3. The corner clip of claim 1 wherein the first and second channels extend substantially along the entire length of the outer sides.

4. The corner clip of claim 1 wherein the first and second lips extend substantially along the entire length of the inner sides.

5. The corner clip of claim 1 wherein the base plate is steel, 0.016 inch thick.

6. The corner clip of claim 1 wherein the base plate is plastic.

7. The corner clip of claim 1 wherein the first leg is perpendicular to the second leg.

8. The corner clip of claim 1 wherein the first and second inner sides form an inner corner, and a recess is provided at the corner.

* * * * *